Nov. 18, 1969     W. C. SMITH     3,478,906

GRAPPLE

Filed Oct. 19, 1967

Willard C. Smith
INVENTOR.

BY *Stefan M. Stein*
ATTORNEY

United States Patent Office 3,478,906
Patented Nov. 18, 1969

3,478,906
GRAPPLE
Willard C. Smith, Dade City, Fla., assignor to Pasco Packing Company, Dade City, Fla., a corporation of Florida
Filed Oct. 19, 1967, Ser. No. 676,431
Int. Cl. B65b 69/00; B65g 65/40; B66c 1/10
U.S. Cl. 214—304                                6 Claims

ABSTRACT OF THE DISCLOSURE

A grapple for a basket, such as a fruit loading basket, which includes a horizontally disposed hoist tube, a spindle assembly affixed to its center and connected to the hoist and containing a rotation limit means and preferably a basket door latch release mechanism within said hoist tube.

---

This invention relates to a grapple and more particularly to a grapple for a fruit loading basket.

In fruit harvesting, such as orange picking, one method involves hand picking of the fruit, deposition of the picked fruit into a bag hung on the picker and subsequent emtying of the bag into large baskets located throughout the grove. A dump truck mounted derrick then picks up each basket and empties it, usually through a bottom opening door, into the dump body of the truck for subsequent dumping at the fruit handling plant.

Prior art devices have been devised for handling the basket. Unfortunately, none have been too satisfactory because of the complicated structure or operating mechanism employed, the inherent lack of durability, the need to use the device in a certain manner, the need for a certain specific basket structure or hoist, and other factors. For example, the apparatus illustrated in U.S. Patent 2,981,424 requires a three-arm grapple or "lift-bar" as it is termed with extensive structure at the center of the bar to "center" or position the bar perpendicular to the boom. The basket must apparently also have a specific structure to be operable with the latch-trip mechanism of the trip arm. U.S. Patent 3,119,505 teaches an effort at an improvement but leaves much to desired. Now apparently a four-arm lift-bar is required with a modified or totally different centering means. In actual use in groves, either patented apparatus has proved to be costly in maintenance with parts and functions which are unnecessary.

An object of this invention is to provide a novel basket grappling means.

Another object is to provide a basket grappling means of simplified durable construction.

Still another object is to provide a basket grappling means usable with any hoist mechanism of standard design.

A further object is to provide a basket grappling means having minimal maintenance needs.

A still further object is to provide a basket grappling means wherein the basket door release means and the lift means can be combined.

Another object is to provide a basket grappling means which does not possess positioning means relative to the basket and the boom to be operable.

Other objects of the invention will in part be obvious and will in part appear hereinafter.

The basket grappling device of this invention, in its broadest aspects, comprises a hoisting tube to the center of which is affixed a spindle assembly. The spindle assembly contains a partially rotatable hook means, which secures to the hoist and within the hoisting tube is a basket door release means.

More particularly, the basket grappling device of this invention comprises a horizontally disposed hoisting tube. Affixed to the center of the tube, usually by welding, is a spindle assembly. Extending upwardly out of the spindle assembly is an eye bolt, the eye of which hooks onto the hoist mechanism whereby the entire hoisting tube, spindle, and auxiliary mechanism affixed thereto is raised and lowered. The eye bolt has an inverted mushroom shape, with at least one lug extending upwardly from the mushroom head. The lug is located in a limit notch of the spindle housing and limits the rotation of the hoisting tube merely to the extent permitted by the clearance between the lug and the notch.

Within the hoisting tube is a pneumatic cylinder which acts upon a releasing dog. The dog, when activated trips a latch on the fruit basket thereby permitting the door of the basket to open. The door is preferably a bottom opening door, although a side door could be used.

The device is useful with any hoist of standard design and with any fruit basket having a latch operable by said releasing dog. Because of its simpliled structure, maintenance and skill in use of the device is minimal thereby permitting operation by unskilled fruit harvesters.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which.

Similar reference characters referred to similar parts throughout the several views of the drawing.

Figure 1:
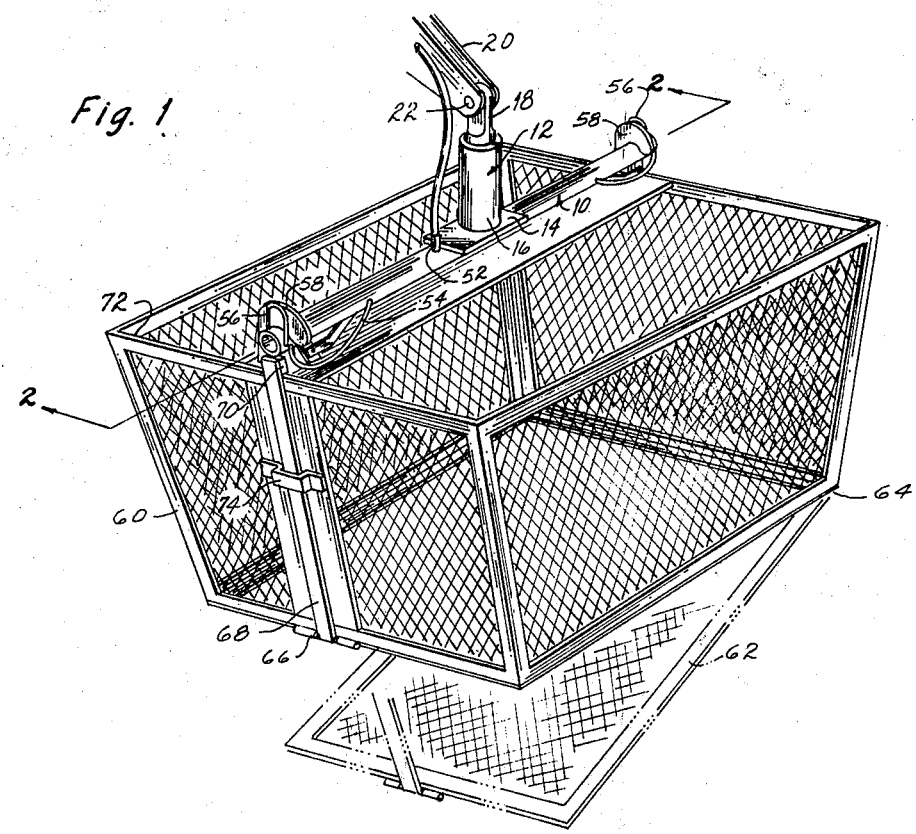
FIG. 1 is a perspective view of the grapple of this invention shown engaging a fruit basket.
Figure 2:
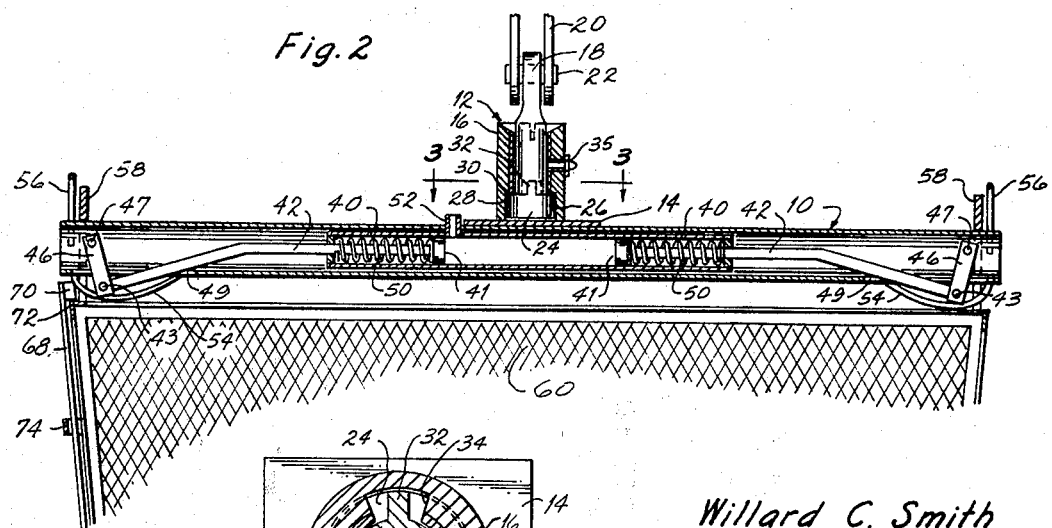
FIG. 2 is a cross-sectional view of the grapple and a portion of the basket taken on line 2—2 of FIG. 1.

Referring specifically to FIGS. 1 and 2, the grapple of this invention comprises a hollow hoisting bar or hoisting tube 10, which is horizontally disposed during use. At its center is a spindle assembly 12, which is preferably welded to a hoisting tube plate 14, which in turn is welded to the hoisting tube 10. The spindle assembly could also be directly affixed to the hoisting tube by appropriately shaping the lower surface of spindle housing 16 to conform to the curved surface of tube 10 and welded thereto, but obviously, such requires more extensive assembly work and therefore is less desirable. Bolting of the spindle using a U-bolt extending through plate 14 or even directly through the spindle housing 16 could also be utilized. In any event, the spindle assembly is secured to tube 10.

Extending upwardly out of the spindle housing 16 is a hoist eye bolt 18, which secures the hoisting tube 10 and the spindle assembly 12 to the hoist 20, via hoist bolt 22. The hoist may be of any design such as those commonly sold in the market. It may be affixed to a truck, or tractor, or any other device used in the grove whereby the versatility of the grapple of this invention is extended. That is, it may be affixed to chassis designed solely for hoisting and dumping into another vehicle or for hoisting and transporting fruit-laden baskets or for hoisting and dumping fruit-laden baskets into a hopper mounted on the same chassis.

The lower end of the hoist eye bolt 18 has an inverted mushroomed head 24 which fits within an enlarged cavity 26 of mating shape. The outer ends 28 of head 24 fit under ledge 30. Such a structure provides a support between hoist 20 and the grapple structure of this invention.

Figure 3:
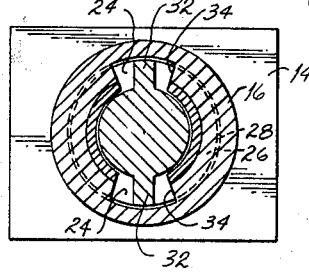
FIG. 3 is a cross-sectional view of the spindle assembly of the grapple taken along line 3—3 of FIG. 2.

Extending upwardly from the outer end 30 of head 24 of eye bolt 18 is at least one lug 32 (two shown in FIG. 3) which is located within limit notch 34 of spindle housing 16. Its function is to prevent complete rotation of the hoist tube 10. The reason will become evident as the description proceeds. Grease fitting 35 facilitates greasing of the inner working parts of the spindle assembly. A brass bushing may be employed between the eye bolt and the spindle housing to absorb damaging wear.

The inner cavity of hoist tube 10 contains a double piston pneumatic release mechanism comprising a cylinder 40 containing two outer release pistons 41. Extending outwardly from each piston 41 is a release piston rod 42 which is pivotally connected via pin 43 to basket latch release dog 46. Dog 46 is pivoted at pin 47 and extends outwardly from a downwardly facing slot 49 cut in the hoist tube 10, as best seen in FIG. 2. Return spring 50 provides for the return of release piston 41 to its cocking position. The piston is actuated by pneumatic pressure, such as oil or air pressure supplied via nipple 52 through a control valve in the cab of the vehicle to which the hoist is attached.

Dog guard 54 protects the release dog 46 against damage during use.

Referring to FIG. 1, the extreme outer end of hoist tube 10 each has an end guide 56 welded thereto in an upwardly extending manner. Hooks 58 on each side of fruist basket 60 are engaged by the hoist bar and the guide 56 at each end prevents side slip of the hook off either end of the hoist tube 10 once the hooks are engaged.

It will be noted that the hooks 58 face in the same direction in FIG. 1. Such positioning enables a swooping engagement of the hooks by the hoist tube 10. If desired, the hooks could face in an opposite direction to each other. In such instance, a twisting motion is imparted to the hoist tube 10 via manipulation of hoist 20 to engage the hooks.

The fruit basket 60 preferably is of the bottom opening type with bottom door 62 pivoted at 64 to a bottom edge of one side of the basket. Affixed to the free end of door 62 via hinge 66 is a door lock bar 68. Its upper end comprises a latch which is simply a block 70 of metal integral with the upper end of the bar 68, and which extends over the upper rim 72 of basket 60. The weight of the door and the fruit in the basket is sufficient to cause a sturdy catch once the block of metal is positioned up over rim 72.

Lock bar 68 is held snugly against the side of basket 60 by a shallow channel bracket 74. Its shallowness and position with respect to rim 72, coupled with the resiliency of lock bar 68, controls the degree of release force needed to force bar 68 outwardly to release block 70 from rim 72. Its position also controls the extent to which bottom door 62 will open and it may be located so that door 62 will act as a chute during unloading of the fruit. In this regard, sides (not shown) could be added to the side edges of door 62 to increase the chuting effect.

It should be evident that the hoist tube being constructed with a double acting basket door catch release means, increases its versatility.

Tilt dumping of the fruit basket may also be employed. In such instance, lug 32 within the spindle assembly acts to stabilize the basket whereby only single point contact of one side of the basket with subsequent tilting need be used.

The grapple structure shown is obviously simple in design, and is economical to build and to maintain. Each operating part, particularly the spindle assembly and the release mechanism are fully protected against damaging blows usually found in fruit loading operations. And, the basket is also simple to build and to maintain with very few operating parts to malfunction.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawing shall be interpreted as illustrative and not in a limiting sense.

Now that the invention has been described—

What is claimed is:

1. A grapple for a basket having two hooks disposed on opposite sides for lifting said basket comprising a substantially horizontally disposed hoisting tube bar for contacting said two hooks and a spindle assembly affixed to the substantial center of said hoisting tube bar, said spindle assembly consisting of a housing, a cavity located in the bottom portion of said housing, an inverted mushroom-shaped eye bolt extending upwardly therefrom for affixation to a hoist with the mushroom head of said bolt contained within said cavity, a limit notch of predetermined width located in said housing which is of mating shape to said head, and at least one lug having a width less than that of the notch extending from said head into said limit notch to limit the rotation of the hoisting tube to the extent permitted by the clearance beween the lug and the notch.

2. The grapple of claim 1 wherein said housing contains a brass lining and a grease fitting to lubricate said spindle assembly.

3. The grapple of claim 1 wherein said basket has a door with a latch and said hoisting tube contains a release mechanism for releasing said latch.

4. The grapple of claim 3 wherein said release mechanism comprises a pneumatic cylinder with a piston and rod operable upon a releasing dog pivotally secured to said hoisting tube.

5. The grapple of claim 4 wherein said tube has a dog guard secured thereto for protecting said dog against damage.

6. The grapple of claim 1 wherein said hoisting tube has guides 56 extending upwardly therefrom to prevent side slip of the hooks of the basket off either end of the hoist tube.

References Cited

UNITED STATES PATENTS 2,981,424  4/1961  Petersen _____ 214—77
3,119,505  1/1964  Petersen _____ 214—658

HARVEY C. HORNSBY, Primary Examiner

U.S. Cl. X.R.

287—103; 294—81